Dec. 21, 1948.  S. P. BECKER  2,456,808
LINE TAP CLAMP
Filed Oct. 23, 1947

INVENTOR.
Stephen P. Becker
BY Duell and Kane
ATTORNEYS

Patented Dec. 21, 1948

2,456,808

UNITED STATES PATENT OFFICE 2,456,808

LINE TAP CLAMP

Stephen P. Becker, Poughkeepsie, N. Y., assignor to Fargo Mfg. Company, Inc., Poughkeepsie, N. Y., a corporation of New York Application October 23, 1947, Serial No. 781,562

5 Claims. (Cl. 24—81)

1

This invention relates to a structurally and functionally improved clamp and especially a clamp employed to secure a pair of cables in proper association with each other; such cables being desirably in the form of single or multi-strand electrical conductors to be connected without employing solder or welding.

It is a primary object of the invention to provide a unit of this type which will establish an extremely desirable form of connection between two conductors or cables with which it is associated; such connection assuring passage of current from one conductor to the other with minimum losses.

A further object is that of providing a unit of this character by means of which the conductors will be at all times properly encased. Therefore, there will be no danger of the conductors or cables becoming accidentally disassociated with the clamp while the latter is being applied, or at any other time.

A still further object is that of furnishing a clamp which will include relatively few and long-lived parts each individually simple and rugged in construction; these parts being capable of economical manufacture by quantity production methods and moreover being capable of ready assembly and cooperation with conductors to achieve the desired results.

With these and other objects in mind, reference is had to the attached sheet of drawings illustrating one practical embodiment of the invention and in which.

Figure 1:
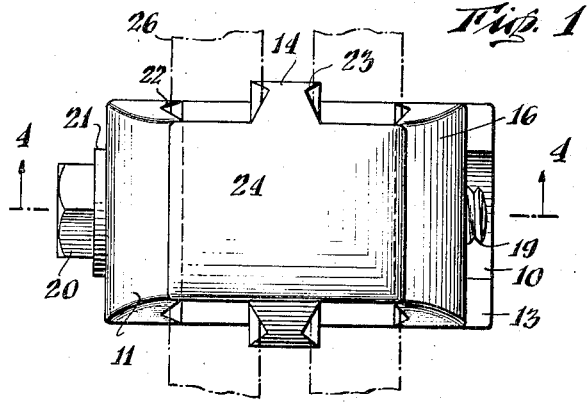
Fig. 1 is a top plan view of the clamp.
Figure 2:
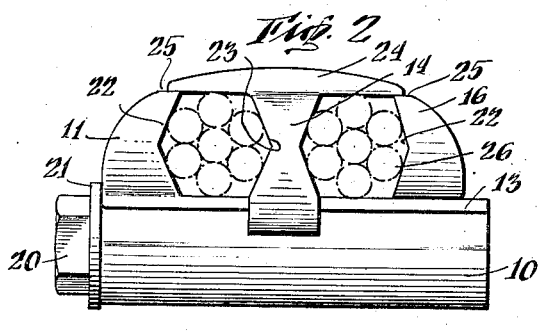
Fig. 2 is a side view thereof.
Figure 3:
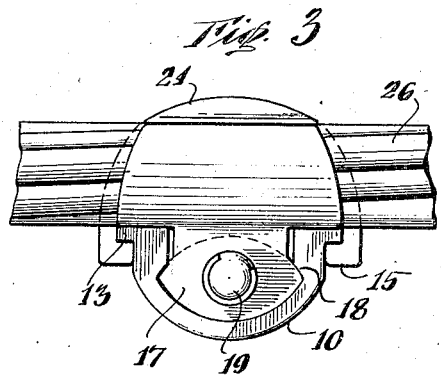
Fig. 3 is an end view of the assembly.
Figure 4:
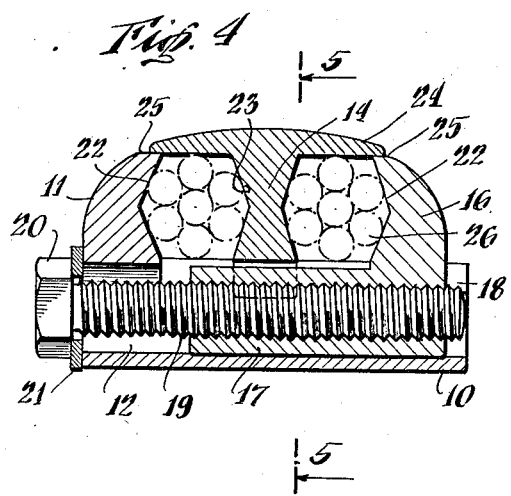
Fig. 4 is a sectional side view taken along the lines 4—4 and in the direction of the arrows as indicated in Fig. 1.
Figure 5:
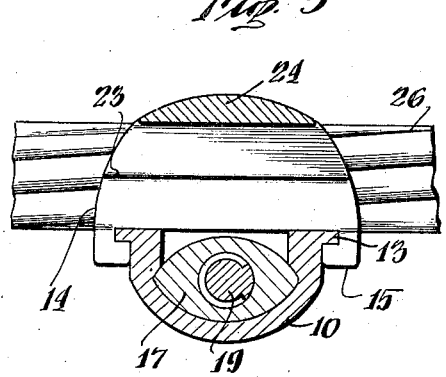
Fig. 5 is a transverse sectional view taken along the lines 5—5 and in the direction of the arrows as indicated in Fig. 4.

In these views, the numeral 10 indicates a body member which, as especially shown in Figs. 3 and 4, provides a channel. Adjacent one of its ends this member is provided with a jaw 11 which is preferably integral with the same. In line with the base of the jaw an opening 12 is provided which is disposed in line with the channel of member 10 and which has throughout its lower portion a contour corresponding with the contour of such channel. Adjacent its upper side edges body 10 is provided with rail portions. These are in the form of outstanding flanges 13.

Slidably mounted upon the rail portions is a separator or spacer bar 14. Mounting is prefer-

2 ably achieved by having this bar provided with downwardly and inwardly extended portions 15 adjacent its side edges. These portions underlie the flanges 13. Consequently, the separator is guided for sliding movement along the body 10.

A jaw member 16 is disposed beyond the spacer or separator 14. It is mounted for sliding movement with respect to body 10 by being provided with an extension 17 which projects inwardly in the direction of the jaw 11. This extension has a sliding fit within the channel of member 10. It is preferably elliptical in section and has dimensions, such that it may be extended within and may in fact pass through the opening or bore 12. Due to the overlapping portions 18 defining the upper surfaces of the channel of member 10, it is obvious that the extension 17 while freely capable of movement longitudinally of the body 10 will be confined to such movement and effectively supported against displacement in any other direction with respect to the channel member.

With a view to shifting the extension 17 and jaw 16, a bolt 19 is employed. This bolt has a head 20 and a washer 21 of an area greater than the outer end of opening 12 and is interposed between the head 20 and the face of body 10 in line with the outer surface of its jaw 11. Accordingly, the bolt will be prevented from moving inwardly within opening 12. The extension 17 is formed with an axially extending bore, threaded to correspond to the threads of bolt 19. The shank of that bolt being introduced into the bore, it is apparent that by turning the bolt, jaw 16 and extension 17 will shift longitudinally within the channel member.

The inner faces of jaws 11 and 16 are formed to provide shallow V notches 22. The opposed side faces of the separator or spacer bar 14 are similarly formed as indicated at 23. The upper end of the spacer bar or separator is provided with a preferably integral roof portion 24. The latter has its inner face disposed in a plane just above the plane into which the upper edges of jaws 11 and 16 extend. Such upper jaw edges may be flattened as indicated at 25 to provide cooperating guide surfaces. The length of the roof portion is such that with the jaws 11—16 separated to substantially their maximum extent, the end edges of that portion will overlap the inner upper edges of the jaws. As is obvious, the less the distance that jaws 11 and 16 are separated the greater will be the degree of overlap between the roof portion and these jaws.

Thus, a unit is furnished in which one jaw is fixed and the other jaw movable. Disposed between these jaws and capable of sliding movement with respect to both of the same is the spacer bar and its roof portion. Due to the fact that the opposed surfaces of the separator bar and jaws present shallow V-shaped notches, it is apparent that an extremely desirable engagement between these surfaces and interposed cables or conductors 26 will occur. Also, a great latitude of cable sizes may be accommodated within the jaws, with perfect assurance that a firm and otherwise desirable type of engagement will occur between these cables or conductors and the adjacent surfaces of body 10, jaws 11 and 16 and the roof portion 24.

In use it will be obvious that after the parts have been assembled they may be adjusted so that the jaws 11 and 16 are separated to a maximum extent. One cable 26 will be disposed in the space between the separator and, for example, the jaw 11. The second cable will be disposed between opposite faces of the spacer bar and the jaw 16. Thereupon, by means of the bolt 19, the jaw 16 will be drawn inwardly towards the jaw 11. With such movement, it will engage the adjacent cable. The latter will, in turn, bear against the spacer bar 14 to shift that member towards the jaw 11. Accordingly, the cable interposed between the separator or spacer 14 and the jaw 11 will be shifted to a point where it engages the latter. Under contained tightening intimate and proper electrical connection will be established between the cables. Such connection will be free from any necessity of using soldering or welding. As the parts are tightened to the desired extent, any tendency of the cables to ride out of the spaces within which they are properly disposed will be prevented by the extended roof portion 24. Also, as the parts are clamped, it will be apparent that any strain on the inner face of the portion 24 and which would tend to restrain the latter from moving longitudinally of the body 10 will be prevented incident to the engagement which may occur between the inner face of the roof portion 20 and the edge surfaces 25. With the sliding contact thus established, the separator will at no time be forced to a position where it is tilted to an extent such that it jams against the rails or flanges 13.

Thus, among others the several objects of the invention as specifically afore noted are achieved. Obviously numerous changes in construction and rearrangement of the parts might be resorted to without departing from the spirit of the invention as defined by the claims.

What I claim is:

1. A clamp including a body, a jaw fixed with respect to said body and extending outwardly from one end of the same, a second jaw mounted for slidable movement towards and away from said first jaw, means supported by said body and cooperating with said second jaw for moving the same, a separator bar slidably supported by said body and interposed between the inner faces of said jaws, the upper edge of said separator bar extending into a plane beyond that in which the upper edges of said jaws extend and cable retaining means projecting from the extended portion of said bar in the direction of said jaws.

2. A clamp including a body, a jaw fixed with respect to said body and extending outwardly from one end of the same, a second jaw mounted for slidable movement towards and away from said first jaw, means supported by said body and cooperating with said second jaw for moving the same, a separator bar slidably supported by said body and interposed between the inner faces of said jaws, the upper edge of said separator bar extending into a plane beyond that in which the upper edges of said jaws extend and a roof portion projecting in lateral directions adjacent the upper edge of said separator bar and overlapping the upper edges of said jaws.

3. A clamp including a body, a jaw fixed with respect to said body and extending outwardly from one end of the same, a second jaw mounted for slidable movement towards and away from said first jaw, means supported by said body and cooperating with said second jaw for moving the same, a separator bar slidably supported by said body and interposed between the inner faces of said jaws, the upper edge of said separator bar extending into a plane beyond that in which the upper edges of said jaws extend, a roof portion projecting in lateral directions adjacent the upper edge of said separator bar and overlapping the upper edges of said jaws and such upper jaw edges being flattened to cooperate with the underface of said roof portion.

4. A clamp including a body, a jaw fixed with respect to said body and extending outwardly from one end of the same, a second jaw mounted for slidable movement towards and away from said first jaw, means supported by said body and cooperating with said second jaw for moving the same, a separator bar mounted for slidable movement by said body and interposed between said jaws and a roof portion extending laterally adjacent the upper edge of said bar and overlapping the upper edges of said jaws.

5. A clamp including a body, a jaw fixed with respect to said body and extending outwardly from one end of the same, a second jaw mounted for slidable movement towards and away from said first jaw, means supported by said body and cooperating with said second jaw for moving the same, a separator bar mounted for slidable movement by said body and interposed between said jaws and a roof portion extending laterally adjacent the upper edge of said bar and overlapping the upper edges of said jaws, said roof portion presenting a substantially flat lower face and the upper edges of said jaws being also flattened to slidably bear against said underface of the roof portion.

STEPHEN P. BECKER.

REFERENCES CITED

The following references are of record in the file of this patent:

UNITED STATES PATENTS

| Number | Name | Date |
| --- | --- | --- |
| 1,283,792 | Keator | Nov. 5, 1918 |
| 1,718,751 | Matthes | June 25, 1929 |
| 1,932,009 | Becker | Oct. 24, 1933 |
| 1,932,010 | Becker | Oct. 24, 1933 |
| 1,964,803 | Alsaker | July 3, 1934 |

FOREIGN PATENTS

| Number | Country | Date |
| --- | --- | --- |
| 95,817 | Sweden | May 30, 1939 |